United States Patent
Goslin et al.

(10) Patent No.: US 11,465,050 B2
(45) Date of Patent: Oct. 11, 2022

(54) INTELLIGENT BOARD WITH INTEGRATED DEVICES AND CONNECTED INTERACTIONS

(71) Applicant: Disney Enterprises, Inc., Burbank, CA (US)

(72) Inventors: Michael P. Goslin, Sherman Oaks, CA (US); Elliott H. Baumbach, Porter Ranch, CA (US); Tritia V. Medrano, Rowland Heights, CA (US); Timothy M. Panec, Studio City, CA (US); Clifford Wong, Burbank, CA (US); Nathan D. Nocon, Valencia, CA (US); Jason A. Yeung, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/849,278

(22) Filed: Apr. 15, 2020

(65) Prior Publication Data
US 2021/0322883 A1 Oct. 21, 2021

(51) Int. Cl.
*A63F 13/65* (2014.01)
*A63F 3/00* (2006.01)

(52) U.S. Cl.
CPC .......... *A63F 13/65* (2014.09); *A63F 3/00643* (2013.01); *A63F 2003/00652* (2013.01)

(58) Field of Classification Search
CPC .............................. A63F 13/65; A63F 3/00643
See application file for complete search history.

(56) References Cited

U.S. PATENT DOCUMENTS

| 6,761,634 | B1* | 7/2004 | Peterson | A63F 3/00643 463/30 |
| 8,480,469 | B2* | 7/2013 | Haltovsky | G06F 1/1626 463/16 |
| 9,498,711 | B2* | 11/2016 | Assa | A63F 13/80 |
| 9,884,254 | B2* | 2/2018 | Yim | A63F 13/2145 |
| 10,099,112 | B1* | 10/2018 | Johnson | A63F 3/00094 |
| 2005/0288078 | A1* | 12/2005 | Cheok | A63F 13/65 463/1 |
| 2009/0115133 | A1* | 5/2009 | Kelly | A63F 13/52 273/274 |
| 2010/0331083 | A1* | 12/2010 | Maharbiz | A63F 3/00643 463/30 |
| 2012/0049453 | A1* | 3/2012 | Morichau-Beauchant | A63F 13/213 273/236 |
| 2012/0083325 | A1* | 4/2012 | Heatherly | A63F 9/24 463/16 |
| 2013/0123009 | A1* | 5/2013 | Maharbiz | A63F 3/00643 463/31 |

(Continued)

*Primary Examiner* — Seng H Lim
(74) *Attorney, Agent, or Firm* — Patterson + Sheridan, LLP (57) ABSTRACT

Techniques and systems for immersive interactions are provided. A first smart device available for interaction is identified by an interactivity system. A first physical game piece is detected by the interactivity system, and a first identifier of the first physical game piece is received, from the first physical game piece, via one or more wireless signals. A first set of predefined effects that can be performed using the first smart device is identified based on the first identifier. The first smart device is instructed to perform at least a first predefined effect of the first set of predefined effects.

20 Claims, 8 Drawing Sheets

(56) References Cited

U.S. PATENT DOCUMENTS

| | | | | |
|---|---|---|---|---|
| 2013/0217496 A1* | 8/2013 | Olkin | ............... | A63F 3/00697 |
| | | | | 463/32 |
| 2015/0231486 A1* | 8/2015 | Murdock | ............ | A63F 9/0468 |
| | | | | 463/22 |
| 2016/0067593 A1* | 3/2016 | Yim | ..................... | A63F 13/23 |
| | | | | 463/31 |
| 2016/0067616 A1* | 3/2016 | Yim | ..................... | G06T 19/006 |
| | | | | 463/34 |
| 2016/0101364 A1* | 4/2016 | Scott | ................. | A63F 13/822 |
| | | | | 463/31 |
| 2019/0388776 A1* | 12/2019 | Holmes | .................. | A63F 9/24 |
| 2021/0236912 A1* | 8/2021 | Endo | ............... | A63F 3/00697 |

\* cited by examiner

INTELLIGENT BOARD WITH INTEGRATED DEVICES AND CONNECTED INTERACTIONS

BACKGROUND

The present disclosure relates to interactive devices, and more specifically, to integrated interaction systems to provide immersive and additional interactivity.

Many popular games today, such as board games, card games, party games, and video games, are played around a table or other central area. In current systems, the game is constrained to the surface of the table, and game pieces can be placed and moved on it. This restricted environment reduces the interactivity and immersion for the players. Frequently, game systems (such as board games and card games) involve physical game pieces. When aspects of the game are played out, the users must determine how to proceed according to the rules, and must further manually move around the physical game pieces to carry out the game play. More immersive and interactive systems are desired.

SUMMARY

According to some embodiments of the present disclosure, a method is provided. The method includes identifying, by an interactivity system, a first smart device available for interaction. The method further includes detecting, by the interactivity system, a first physical game piece, and receiving, from the first physical game piece via one or more wireless signals, a first identifier of the first physical game piece. Additionally, the method includes identifying, based on the first identifier, a first set of predefined effects that can be performed using the first smart device, and instructing the first smart device to perform at least a first predefined effect of the first set of predefined effects.

According to some embodiments of the present disclosure, a non-transitory computer-readable medium is provided. The non-transitory computer-readable medium contains computer program code that, when executed by operation of one or more computer processors, performs an operation. The operation includes identifying, by an interactivity system, a first smart device available for interaction. The operation further includes detecting, by the interactivity system, a first physical game piece, and receiving, from the first physical game piece via one or more wireless signals, a first identifier of the first physical game piece. Additionally, the operation includes identifying, based on the first identifier, a first set of predefined effects that can be performed using the first smart device, and instructing the first smart device to perform at least a first predefined effect of the first set of predefined effects.

According to some embodiments of the present disclosure, a system is provided. The system includes one or more computer processors, and a memory containing a program which, when executed by the one or more computer processors, performs an operation. The operation includes identifying, by an interactivity system, a first smart device available for interaction. The operation further includes detecting, by the interactivity system, a first physical game piece, and receiving, from the first physical game piece via one or more wireless signals, a first identifier of the first physical game piece. Additionally, the operation includes identifying, based on the first identifier, a first set of predefined effects that can be performed using the first smart device, and instructing the first smart device to perform at least a first predefined effect of the first set of predefined effects.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Embodiments of the present disclosure provide systems and techniques to integrate various sensors and devices into interaction environments in order to supplement and enhance the interaction. In some embodiments, the environment can include an interactive board and cards or other game pieces that can be placed thereon during gameplay. In one embodiment, each card or game piece can contain a unique identifier (such as a near-field communication (NFC) memory chip). In at least one embodiment, multiple such chips may be utilized (e.g., one on each face of the card), in order to communicate the current state of the piece to the game board (e.g. face up or face down). In related embodiments, similar technology can be embedded in other game pieces such as tokens and figurines, in order to convey similar contextual information.

In some embodiments, the system can further enable the game board to wirelessly communicate with other devices, such as a user's phone, where interactive gameplay can be enhanced (e.g., using an application). Further, in one embodiment, when a card or other game piece is played on the game board, information can be read and written between the card and the board. For example, the system may detect whether the card has been placed up or down. Upon detecting the position/state of the card, a corresponding effect may be triggered (e.g., on the interactive board itself, and/or through other devices such as Internet of Things (IoT) devices in the environment, an app on the user's phone, and the like.) Additionally, in one embodiment, information can be written to the card, which can affect future gameplay. For example, a history of how the card has been played previously, and/or comparisons of the current card placement to the overall state of the board, may have an effect on the results of playing the piece.

In one embodiment, the system can utilize various types of game pieces (e.g. character figurines, character cards, enhancement cards, and the like), each of which can have corresponding memory chip(s) for communicating, storing, and modifying information with the game board and each other. For example, one game piece may be of a character, while another is a modifying game piece that changes the characteristics of the character. Continuing this example, when the character game piece and the modification piece are both placed on the board, the board may write, to the character game piece memory, that the modification has been applied.

Additionally, in some embodiments, both sensing and augmented reality (AR) enhancements can be provided using the user's phone. For example, the camera on the phone can be an additional or substitute form of sensing how the game pieces are placed on the board. As another example, the phone may be used to add/view effects in AR, such as a character leveling up or being hurt by the placement of another game piece on the board. By improving how the interaction system detects, identifies, and responds to physical game pieces, immersion and enjoyment can be significantly improved.

In some embodiments, the smart tabletop device (e.g. game board, mat, tabletop, or other device) can be communicatively connected to various devices in a room (e.g. IoT devices). This allows the interaction system to communicate commands for facilitating environmental effects in the room during gameplay. For example, when a player makes a big play during the game, the system may trigger a message to be sent from the tabletop device to smart lighting device(s) in the room, causing them to flash and/or change colors. Similarly, sound effects can also be incorporated through connection with smart speakers and other devices. Various audiovisual triggers to these devices can be coordinated by the interaction system. This interactivity can be implemented directly between the tabletop and the devices, and/or synchronized through other devices or systems (such as an application on the user's phone).

In one embodiment, the audiovisual reactions can be more complex, and include movement through a space. For example, if the game involves placing figures onto a surface and moving them around, the system may create effects in the room to reflect the movement (e.g., by selectively using speakers spaced around the room). In at least one embodiment, audio effects can be deployed to sound as if they are outside of the room (e.g., using 3D spatial audio), as well as to create the effect of something moving around the players. For example, the sound of a lion's roar may be programmatically controlled such that it sounds like the lion is getting closer (e.g., by increasing the volume over time). Similarly, the sounds can be individualized based on knowing the position of the table within the room, the general vicinity of the players within the room, and/or where each player is sitting relative to the table. In this manner, a form of surround-sound gameplay interaction can occur.

Figure 1:
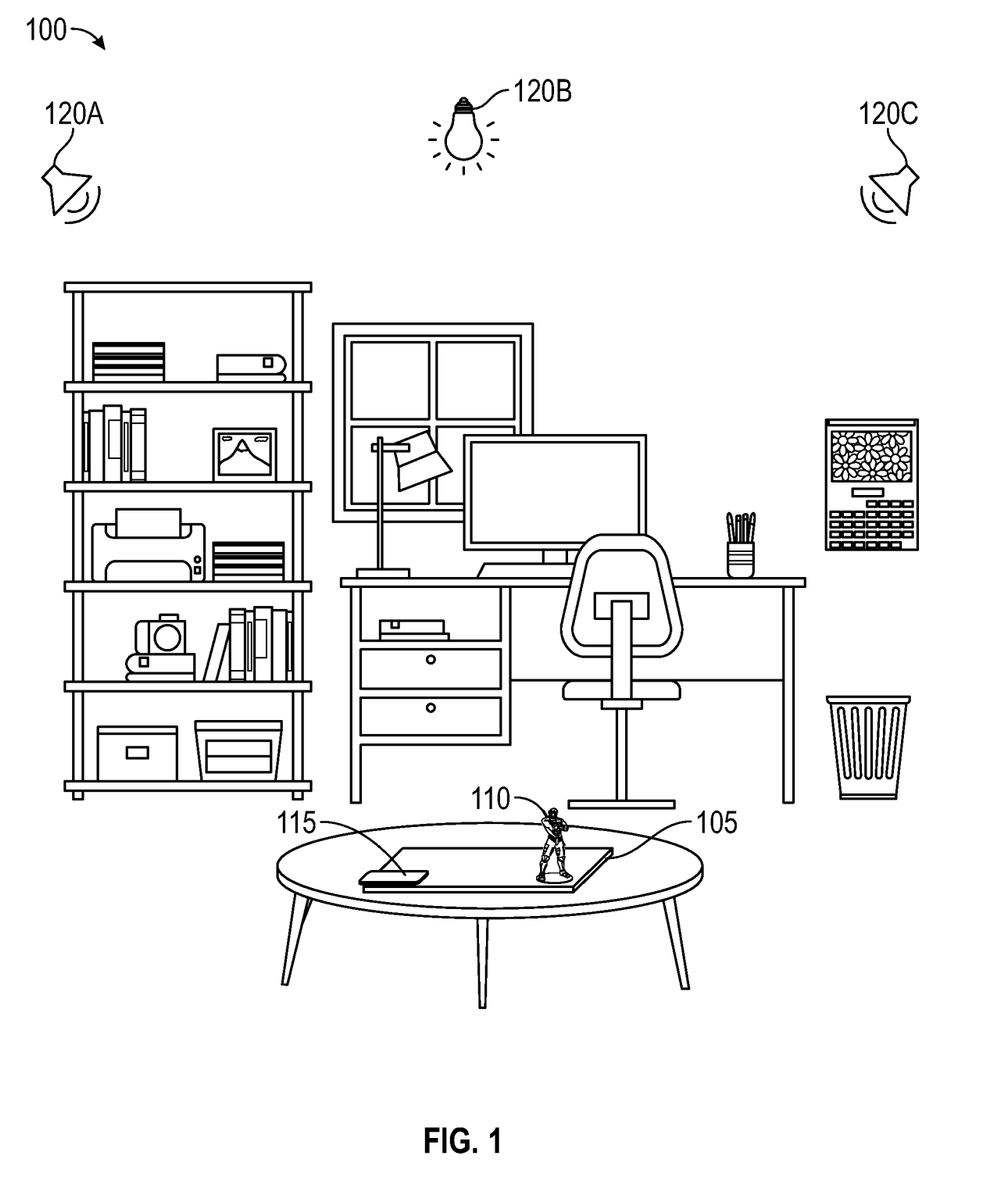
FIG. 1 depicts an environment and interaction system configured to provide immersive interactivity, according to one embodiment disclosed herein.

FIG. 1 depicts an environment 100 and interaction system configured to provide immersive interactivity, according to one embodiment disclosed herein. In the illustrated environment 100, an augmented Board 105 can be communicatively linked with Smart Devices 120A-C. The Board 105 is generally configured to detect and identify game pieces placed on its surface. In one embodiment, this identification is performed via NFC interactions, radio frequency identifier (RFID) techniques, or other wireless communication techniques. In some embodiments, other techniques can be used, additionally or alternatively, to identify game pieces. This may include visual recognition, identifying unique patterns or configurations of each piece (e.g., a unique arrangement of magnets or resistors in the base of a figurine), and the like. In embodiments, any suitable method for detection and identification of the game pieces can be utilized. In at least one embodiment, the Board 105 utilizes one or more amplifiers, which enables the Board 105 to read multiple tiles/pieces stacked on top of each other. This can allow the system to greatly expand the game board vertically.

In some embodiments, in addition to identifying the pieces, the Board 105 is further configured to determine state information for the pieces. This state may include, for example, previous uses/history of the piece, current modifications applied to the piece, and the like. In an embodiment, this state information can be maintained by the game piece itself (e.g., via a memory or storage device embedded in the piece). In another embodiment, using the unique identifier of the piece, the Board 105 may retrieve the corresponding state stored in a database (e.g., maintained by the Board 105, and/or stored in a remote storage such as a cloud server).

In some embodiments, the piece state can further include its position on the Board 105, and/or its orientation. For example, by using a sensor or a number of sensors (e.g., pressure sensors, contact sensors, NFC or RFID sensors, and the like) spaced around the Board 105, the system can determine where the piece has been placed. In one embodiment, the orientation of the piece can be determined using resistors of varying resistance values on the base of the piece. The piece may be placed such that the resistors engage with contact pads on the Board 105, and the Board 105 can determine the resistance of each point in order to determine the direction the piece is facing. In a related embodiment, one or more magnets may be embedded on the base of the piece, and the Board 105 can detect these magnet(s) in order to determine the orientation of the piece. In the illustrated embodiment, there is a Figurine 110 and a Card 115 placed on the Board 105. In embodiments, any suitable game piece can be utilized.

In some embodiments, each game piece may further include a memory component enabling it to store records of prior uses/movements, statistics, and the like. In at least one embodiment, some of the game pieces can additionally include lights (e.g., light-emitting diodes (LEDs)). In one such embodiment, the LED figures are configured to pull power from the Board 105, rather than rely on an internal battery. The LEDs can be triggered/changed based on the gameplay. For example, the Board 105 may cause the LED(s) to activate and deactivate based on events occurring.

As illustrated, the environment 100 includes a set of Smart Devices 120A-C. In embodiments, the Smart Devices 120 can generally include any device capable of providing output, including but not limited to audio, text, images and/or video, lighting, motion, vibration, and the like. For example, the Smart Devices 120 may include one or more speakers, displays, lightbulbs, LEDs, assistant devices, computers, laptops, tablets, smartphones, wearable devices, fitness trackers, and the like. In the illustrated embodiment, Smart Devices 120A and 120C are speakers, while Smart Device 120B is a lightbulb. In embodiments, any number and variety of devices may be utilized. When the Board 105 detects a game event has occurred (e.g., the placing or movement of a game piece), it can evaluate a set of rules in order to identify reaction(s) that can be applied. For example, when a user initiates an attack, the system may retrieve sound and/or lighting effects to augment the attack (e.g., the sound of swords clashing, or the flash of a lightning attack). The Board 105 can then identify the Smart Device(s) 120A-C that are capable of outputting the reaction. In some embodiments, the Board 105 further determines which device(s) to utilize based on predefined rules. For example, differing sounds may be played by different speakers, based on the location(s) and/or orientation(s) of the relevant game pieces. The system can then trigger the selected device(s) to output the identified reaction(s).

In one embodiment, one or more of the Smart Devices 120 are associated with individual users (e.g., the user's phone). In one such embodiment, the Board 105 can output information or audiovisual effects to each user individually by identifying and communicating with the appropriate device(s). Although a smart Board 105 is illustrated, embodiments of the present disclosure can be implemented using a variety of components and devices. For example, a mat or other tabletop component may be utilized. Additionally, a separate device may be utilized to drive the system (e.g., a plugin device that connects to an otherwise "dumb" board). In some embodiments, the Smart Devices 120 can further include devices such as wearables that can be synchronized with a given figure/token. This can enhance role playing in the game, and further add to the immersive experience (e.g., by vibrating when the player is damaged).

In at least one embodiment, the system can utilize multiple Smart Devices 120 (which may include the user's phones, in some embodiments) to synchronize output and create a three-dimensional sound. Based on the physical placement of the devices, the system may control the timing and output of each based on the contents of the game (e.g., to simulate a jet flying in a circle around the board, or an explosion sweeping from one side of the board to the other).

Additionally, though a single Board 105 is illustrated, in some embodiments, the system utilizes dynamic tiles to build the game. For example, utilizing RFID embedded in the Board 105 and/or individual tiles, users can dynamically generate a game/story levels. This can allow the users to unlock new areas as they progress through the game. In some embodiments, the Board 105 also includes memory to store records of the events that happen during play (remembering a history of events).

Further, in at least one embodiment, the Board 105 can include other output such as lights, actuators, motors, and the like. The Board 105 can then modify itself to reflect ongoing changes in the game. For example, the Board 105 may include electronic ink that can be updated/modified to change the visuals depicted by the Board 105. In a related embodiment, one or more projectors may be configured above the Board 105, in order to project visuals (e.g., a map) onto an otherwise plain Board 105. This projection may be mapped for animated board, battle damage, glowing powers around characters, and the like.

Figure 2A:
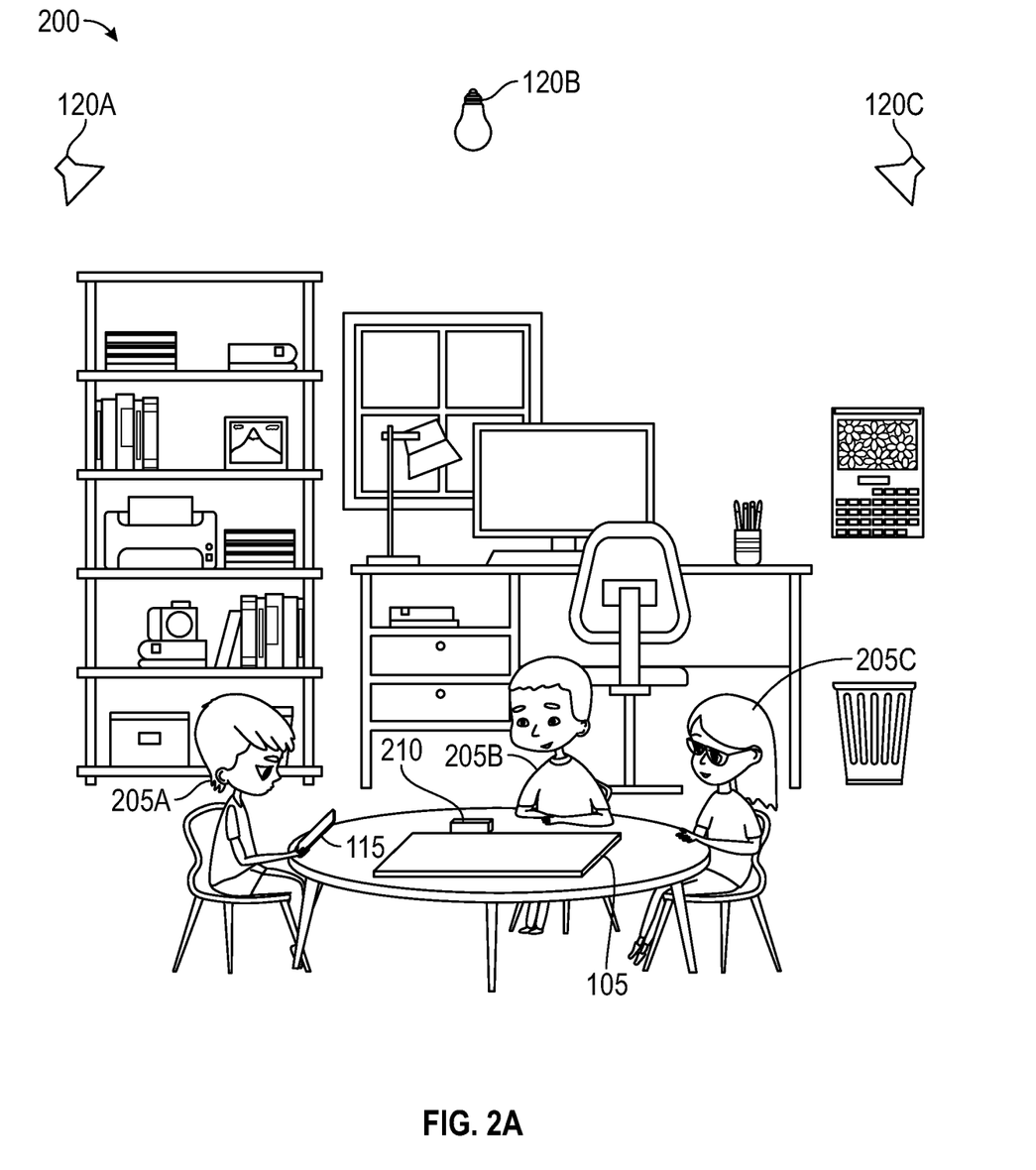
FIGS. 2A and 2B depict an action and automated reaction in an immersive environment, according to one embodiment disclosed herein.
Figure 2B:
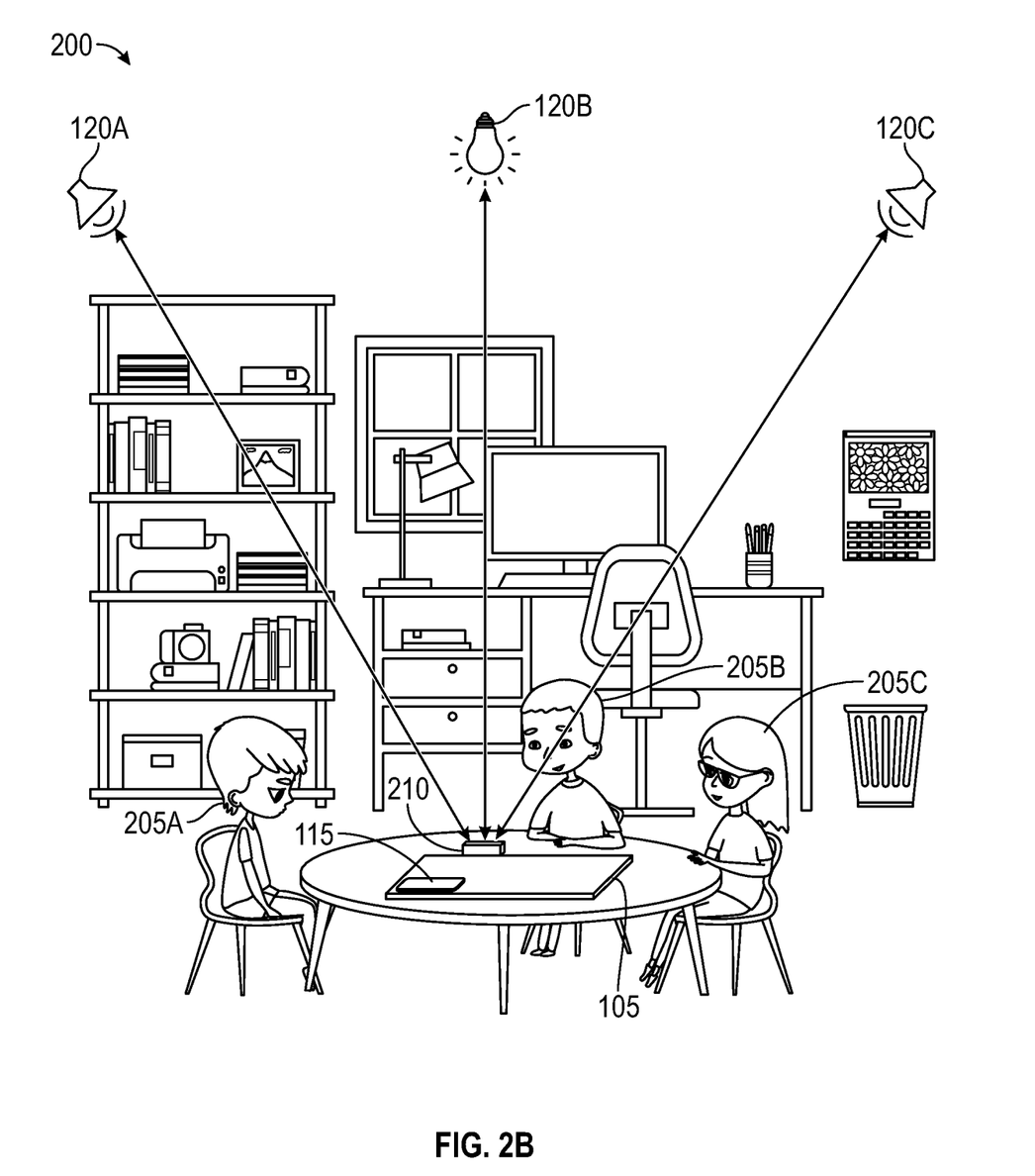

FIGS. 2A and 2B depict an action and automated reaction in an immersive environment, according to one embodiment disclosed herein. FIGS. 2A and 2B depict an environment 200 with a Board 105 and Smart Devices 120A-C. Additionally, a number of Users 205A-C are engaged in the interactive activity. In the illustrated embodiment, an Interaction Component 210 monitors the game to detect and identify pieces as they are played/moved. In an embodiment, the Interaction Component 210 further evaluates predefined rules/effects to determine appropriate outputs for a given action on the Board 105.

In FIG. 2A, the User 205A is holding a Card 115, and is preparing to play the Card 115 (e.g., by placing it on the Board 105). Notably, in FIG. 2A, the Smart Devices 120A-C are not outputting any audiovisual effects (e.g., because nothing has happened in the game). As depicted in FIG. 2B, the User 205A has placed the Card 115 on the Board 105, causing the Interaction Component 210 to trigger the Smart Devices 120A-C to output a corresponding reaction. In embodiments, the Board 105 and/or Interaction Component 210 can detect and identify the Card 115 using any suitable technique.

For example, in one embodiment, the Card 115 includes one or more NFC or RFID chips that can be read by the Board 105 and/or Interaction Component 210 when it is played. In another embodiment, one or more cameras can capture an image of the Card 115, and image analysis can be utilized to identify the card. In an embodiment, identifying the Card 115 includes determining its unique identifier, which can be used to identify relevant effect(s)/rule(s). In some embodiments, in addition to identifying the Card 115, the system can further determine the state of the card and/or context of the play.

For example, the Interaction Component 210 may determine the position on the Board 105 where the Card 115 was played, the orientation of the Card 115 (e.g., face up or face down), and the like. Further, in one embodiment, the Interaction Component 210 can determine the context of the play based on the current state of the game (e.g., how significant an effect the card will have on the current game), the force with which the User 205A placed the card (e.g., using a pressure sensor on the Board 105), and the like.

In an embodiment, based on the identity of the Card 115, the Interaction Component 210 retrieves relevant rule(s)/effect(s), and selects one or more for output. In one embodiment, the Interaction Component 210 identifies reactions that have a predefined association or link to the identity of the Card 115. For example, a user or administrator (e.g., the game designer) may define sound effects, musical pieces, lighting effects, and the like that are appropriate for any given game piece. In some embodiments, the output effects can be linked to specific actions or events in the game, in addition to or instead of being linked to particular pieces. For example, a given sound effect may be associated with playing the Card 115 at one position or point in the game, while a different effect is played if the Card 115 is played later in the game or at a different location.

In an embodiment, the Interaction Component 210 can select which effect(s) to output based on the state/context/identity of the Card 115. In some embodiments, some element of randomness may also be utilized (e.g., to select from a set of possible effects). In at least one embodiment, the Interaction Component 210 can further vary the intensity of the output based on the game context. For example, if the User 205A played the Card 115 forcefully, the volume and intensity of the sound(s) and/or light(s) can be increased. Similarly, if the play will have a significant impact on the game (as determined based on the game rules), the Interaction Component 210 may similarly increase the intensity of the output.

In some embodiments, the Interaction Component 210 can additionally identify which Smart Device(s) 120A-C to output the selected effect(s) based on a variety of criteria. For example, based on the location where the Card 115 is placed, the Interaction Component 210 may identify one or more Smart Devices 120 near this location (or with some other predefined association to that location), and use these devices for output. Similarly, the Interaction Component 210 may select devices based at least in part on the capabilities of each.

In at least one embodiment, each User 205A-C may be associated with a corresponding Smart Device 120. In such an embodiment, the Interaction Component 210 can output the selected effect(s) based on the position of each User 205 in the room and/or in the game. For example, suppose the Card 115 is associated with a sound effect as it is played (e.g., a crack of thunder for a lightning card). In an embodiment, the Interaction Component 210 can output this sound effect to each individual User 205, and vary the intensity of the output based on the distance between the location of the effect (e.g., where the Card 115 was played) and the User 205 (or the user's token in the game). In this way, the Interaction Component 210 can significantly increase the immersion and engagement of the users. As illustrated, once the effect(s) have been selected, the Interaction Component 210 triggers the selected Smart Device(s) 120 to output the effect(s).

In some embodiments, the output effects can include other changes as well. For example, suppose a Card 115 is associated with an initial sound when it is played, and the Card 115 is further associated with a modification that increases the strength of a character each turn. In an embodiment, the Board 105 can remember that the Card 115 has been played, and play an appropriate sound (or display visual effects) to emphasize the growth/change in the character. In another embodiment, the Board 105 may utilize electromagnets to cause the game piece(s) to move if appropriate. For example, if a piece is destroyed in the game, the Board 105 may reverse an electromagnet under the piece to cause it to fall or fly off the Board 105.

In one embodiment, in addition to outputting reactions based on events/actions being taken, the Interaction Component 210 can further modify the output of the Smart Devices 105 and/or Board 105 based on ongoing gameplay. For example, using one or more smart lightbulbs, the Interaction Component 210 may cause the lighting in the room to change (e.g., to a different color) for each player. When it is a given player's turn, the Interaction Component 210 can instruct the lights to change to that player's color. In a related embodiment, if each player has an associated device (such as a phone, or other game piece), Interaction Component 210 can modify the output of these devices (e.g., by activating an LED on the game piece of the current player). Further, the Interaction Component 210 may adjust the room/board lighting to reflect discovered/undiscovered sections of the map, to depict the line of sight of a character, and the like.

Figure 3:
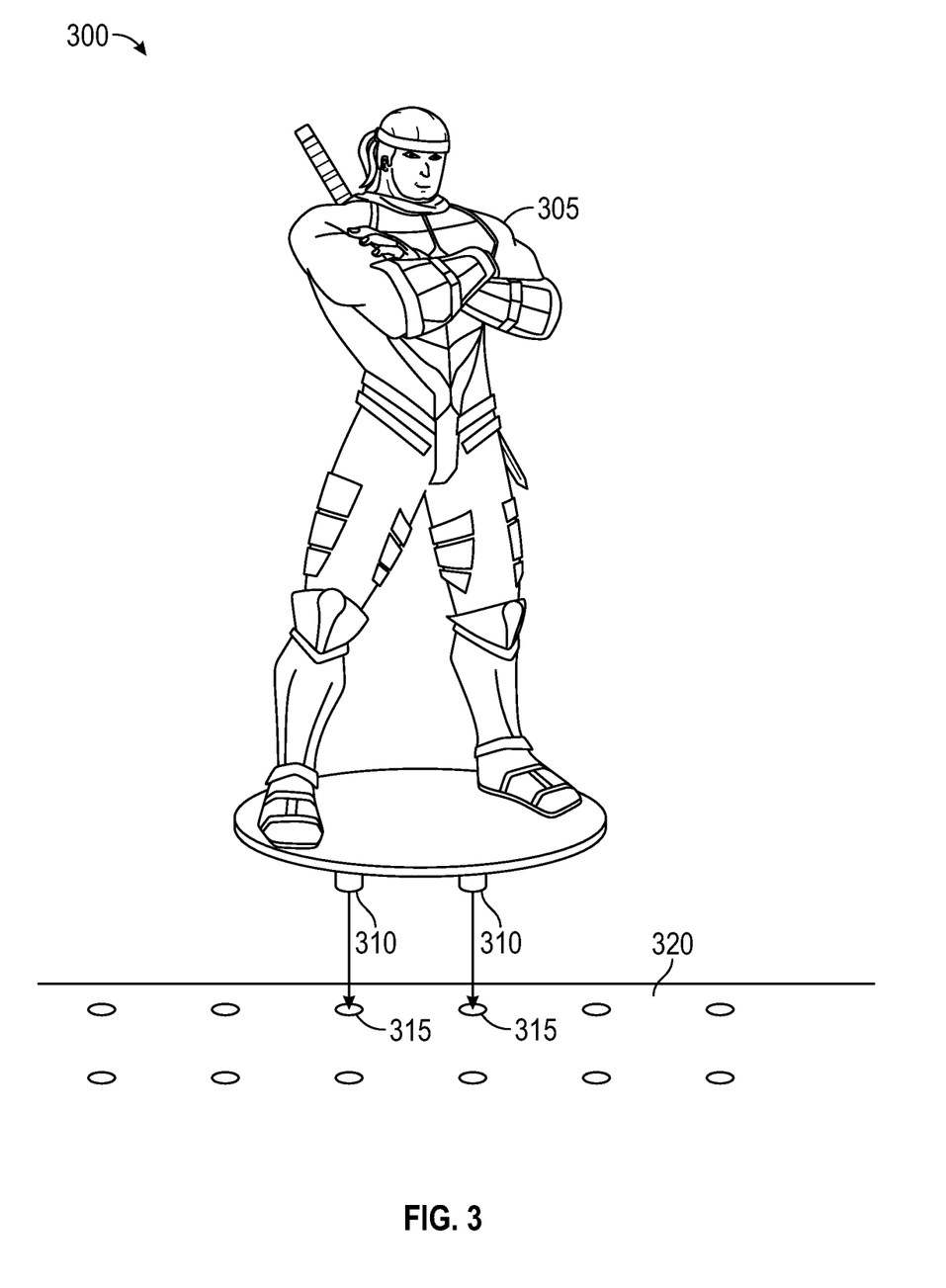
FIG. 3 depicts an integrated game piece and intelligent surface configured to facilitate immersive interactivity, according to one embodiment disclosed herein.

FIG. 3 depicts an integrated Game Piece 305 and intelligent Surface 320 configured to facilitate immersive interactivity, according to one embodiment disclosed herein. In one embodiment, the Surface 320 corresponds to the top of the Board 105. In the illustrated environment 300, the Game Piece 305 is a figurine. In embodiments, the Game Piece 305 can generally be any physical object, including tokens, pawns, figurines, cards, and the like. In the illustrated embodiment, the Game Piece 305 has a set of one or more Indicators 310 used to indicate the orientation of the Game Piece 305 when it is placed on the Surface 320.

In one embodiment, the Indicators 310 are magnets arranged in a predefined configuration (e.g., in specific locations on the base, and/or in a specific pattern of north/south polarity). In another embodiment, the Indicators 310 are resistors, as discussed above. In still another embodiment, the Indicators 310 can be physical protrusions that are inserted into slots or holes in the Surface 320. Although depicted as protrusions that extend beyond the edge of the base for conceptual clarity, in some embodiments, the Indicators 310 are included within the Game Piece 305 and do not protrude from the base of the piece. For example, the Indicators 310 may be embedded flush with the base of the piece, or slightly below the surface (e.g., below a layer of plastic) such that the base of the device is uniform.

In the illustrated embodiment, the Surface 320 includes a set of Sensors 315 arranged wherever the Game Piece 305 can be placed (in accordance with the rules of the game). In some embodiments, the Sensors 315 are located within cavities (e.g., slots, holes, depressions, or other concave openings) in the Surface 320 into which the Indicators 310 are inserted. In another embodiment, the Sensors 315 are surface components (e.g., configured flush with the surface), or are included embedded within the Surface 320 (e.g., below a layer of plastic).

In an embodiment, the structure of the Sensors 315 can relate to the structure of the Indicators 310. For example, if the Indicators 310 are magnets included within the base of the Game Piece 305, the Sensors 315 may be embedded in the Surface 320 and configured to detect magnetic fields. Similarly, if the Indicators 310 are resistors, the Sensors 315 may include electrical contact pads. By passing a small current through the resistors (via the pads), the system can determine which resistor is located in which position. Further, the Indicators 310 and Sensors 315 may similarly be physically designed to accept the other. For example, if the Indicators 310 protrude from the base of the piece, the Sensors 315 may be embedded in cavities such that the Indicators 310 can be inserted into the Sensors 315. Similarly, if the Sensors 315 protrude from the board, the Indicators 310 may be installed in cavities that allow the protruding Sensors 315 to be inserted into the piece. Additionally, either or both of the Indicators 310 and the Sensors 315 may be mounted flush with or just below their respective surfaces, such that the Sensors 315 can detect the Indicators 310 without the need for physical protrusions/cavities.

In an embodiment, the system can thus detect the position of each Indicator 310. By referring to the predefined pattern, arrangement, and/or configuration of Indicators 310 for the Game Piece 305, the system can thereby determine the orientation of the Game Piece 305. For example, in one embodiment, upon identifying the Game Piece 305 (e.g., based on an RFID signal emitted by the piece), the system determines the predefined configuration of Indicators 310 (e.g., four magnets arranged around the base, with alternating polarity). Based on the identified position of each Indicator 310, the system can thus determine the orientation and position of the Game Piece 305.

Although not depicted in the illustrated embodiment, in some embodiments, the Surface 320 further includes one or more sensors configured to determine the identity of the Game Piece 305 (e.g., RFID or NFC sensors). For example, in one embodiment, the Surface 320 includes a number of such detectors such that the system can identify the Game Piece 305 wherever it is placed. In another embodiment, the system may utilize one or more "scan-in" sensors that the player uses to scan the Game Piece 305 prior to placing it on the Surface 320. For example, one or more such detectors may be placed at the edge of the board, or the users may use their phones to scan and identify the Game Piece 305.

In embodiments, once the position and/or orientation of the Game Piece 305 is known, the system can utilize this information in a wide variety of applications, in accordance with the rules of the game. For example, the orientation may affect battle/interactions (e.g., if an attacking character is standing behind another character, the other character may be prevented from counter-attacking). Similarly, the attacking character may deal bonus damage if they attack from behind. Further, in some embodiments, this orientation can enable line-of-sight gameplay, where the elements that are "visible" or accessible to a given Game Piece 305 are limited to those that the Game Piece 305 is oriented to face. Similarly, stealth gameplay can be utilized, where Game Pieces 305 can only detect or see elements which are within the line of sight of the piece. Advantageously, all of these interactions can be automatically determined and enforced by the system, without requiring user intervention.

Figure 4:
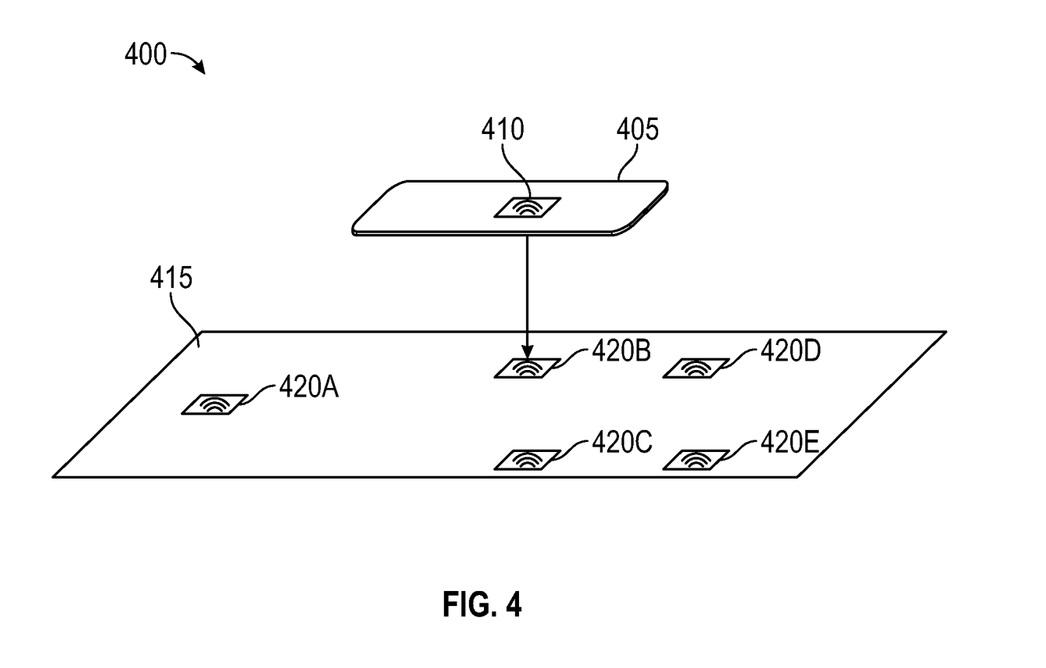
FIG. 4 depicts an instrumented game card and intelligent surface configured to facilitate immersive interactivity, according to one embodiment disclosed herein.

FIG. 4 depicts an instrumented game Card 405 and intelligent Surface 415 configured to facilitate immersive interactivity, according to one embodiment disclosed herein. In one embodiment, the Surface 415 corresponds to the top of the Board 105. In the illustrated environment 400, the object is a Card 405. In embodiments, however, the Card 405 can generally be any physical object, including tokens, pawns, figurines, cards, and the like. In the illustrated environment 400, the Card 405 includes one or more Chips 410 (e.g., RFID or NFC chips) used to identify the Card 405 when it is placed on the Surface 415.

For example, in one embodiment, the Chip 410 is configured to broadcast/transmit a unique identifier of the Card 405, as discussed above. In some embodiments, the Chip 410 is further configured to transmit additional data, such as the current state of the Card 405. For example, the Card 405 may include a memory component that stores state information, and the Chip 410 can be used to transmit this state (and to receive updated states or modifications from the Surface 415). In one embodiment, the state includes records for prior uses of the Card 405. Each record may indicate, for example, a time and/or date when the Card 405 was played, a location on the Surface 415 where it was played, any modifications that have been applied to the Card 405 (e.g., damage increases), and the like. Additional examples of state can include the Card 405 remembering its cool-down state, level-ups, or overall game state. Additionally, in some embodiments, multiple Cards 405 or pieces can be combined to craft new items. For example, physically tapping a Card 405 to a figurine may cause the game to apply the effect of the Card 405 to the figurine.

In the illustrated embodiment, the Surface 415 includes a number of corresponding Sensors 420A-E that are configured to receive the identifier (as well as other information, if applicable) from the Chip 410. In some embodiments, the Sensors 420A-E further transmit updated state information to the Card 405, such as recording a new use of the card, updating the state, modifying its stats, and the like. In the illustrated embodiment, there are a number of Sensors 420 arranged around the Surface 415. Based on the Sensor(s) 420 that detect the Chip 410, the system can identify where the Card 405 has been placed. In some embodiments, the Sensors 420 may be combined with the Sensors 315 discussed above, to enable both information exchange and orientation determinations. In embodiments, the Sensors 420 may be embedded in the Surface 415, applied on the Surface 415, hidden beneath the Surface 415, or in any other configuration suitable to exchange information with the Card 405.

In some embodiments, the system utilizes one or more "scan-in" sensors that the player uses to scan the Card 405 prior to placing it on the Surface 415, as discussed above. For example, the Sensor 420A may be placed near the edge of the board, or the users may use their phones to scan and identify the Card 405. After doing so, the user can play it. In at least one embodiment, the Card 405 may be a hidden, masked, or mystery card with unknown or hidden characteristics (e.g., a blank card, or a card that does not identify itself on its face). In one such embodiment, to determine the statistics/identity of the mystery card, the user can scan it (e.g., with their phone, or with the Sensor 420A). This may reveal the identity of the card to the initiating user, and/or to all users.

Figure 5:
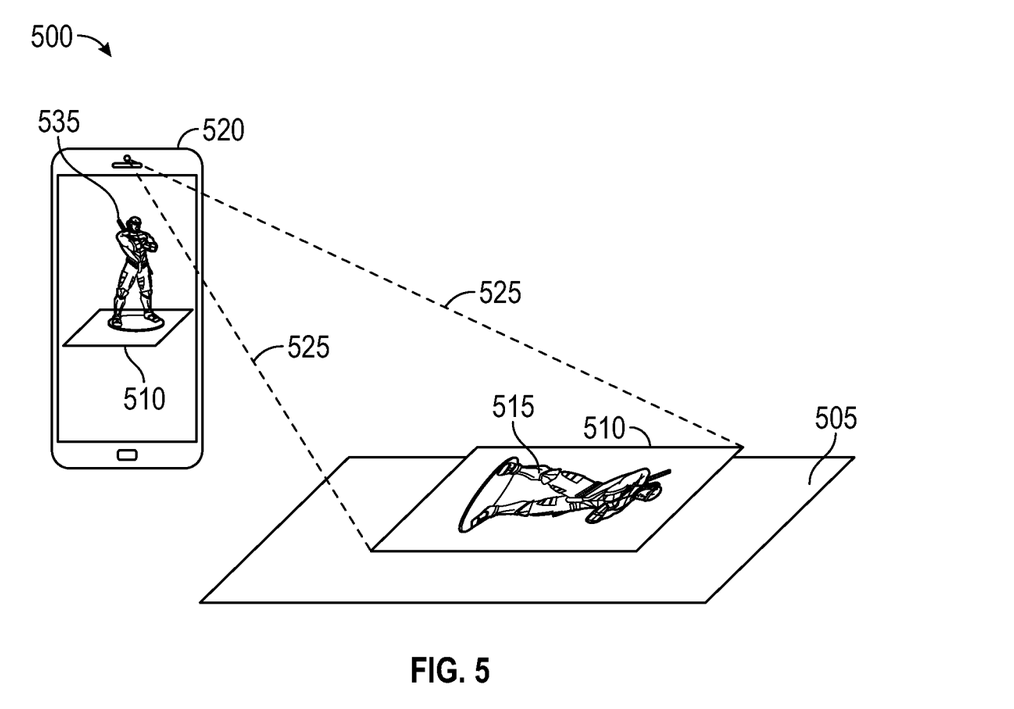
FIG. 5 depicts use of an augmented reality device to supplement interactivity, according to one embodiment disclosed herein.

FIG. 5 depicts use of an augmented reality (AR) Device 520 to supplement interactivity, according to one embodiment disclosed herein. In the illustrated environment 500, a Game Piece 510 has been placed on a Surface 505 (e.g., a game board). As illustrated, the Game Piece 510 is a card with an Image 515 of a character on it. In embodiments, the Game Piece 510 may be any physical object, including figurines, tokens, and the like. Additionally, although the illustrated embodiment includes an Image 515, in some embodiments, there is no image on the Game Piece 510. For example, the Game Piece 510 may be a mystery card that is blank, where the identity/content of the card is revealed during the course of the game.

As illustrated by the sight lines 525, a user is using an AR Device 520 to capture one or more images or videos of the Game Piece 510. The AR Device 520 can generally include any computing device capable of capturing image data. In some embodiments, each user can use their smart phone as an AR Device 520. As illustrated, the AR Device 520 has augmented the captured image(s) with a virtual Character 535 corresponding to the Image 515. That is, although the Game Piece 510 is a flat card with an Image 515 on it, the AR Device 520 generates and renders a virtual three-dimensional character or other element, and displays it superimposed over the captured image(s), as if the character is standing on the Game Piece 510.

In some embodiments, the AR Device 520 can similarly animate the Character 535, such that the user(s) can view the Character 535 responding to input (e.g., attacks), performing actions, and the like. Similarly, the AR Device 520 may receive updated state information (such as damage taken, modifications applied, and the like) and update the virtual Character 535 accordingly. This can allow users to easily visualize the element(s) represented by the Game Piece 510, and dramatically increases immersion and engagement.

In various embodiments, the AR Device 520 can use a number of augmentations to improve the systems. For example, in one embodiment, the AR Device 520 can generate a user interface (UI) and/or heads-up display (HUD), depicting health, attack range, or other stats over the game. In some embodiments, the AR Device 520 can additionally provide new functionality to the game, such as displaying lock picking puzzles, or for resolving combat (e.g., outputting crosshairs for a weapon). The AR Device 520 can also be used for investigative gameplay (e.g., displaying differences on a given tile based on the current game/mission). Further, in some embodiments, the AR Device 520 can modify each player's UI as the game progresses, such as causing the image to become blurry if the user's health is low.

Figure 6:
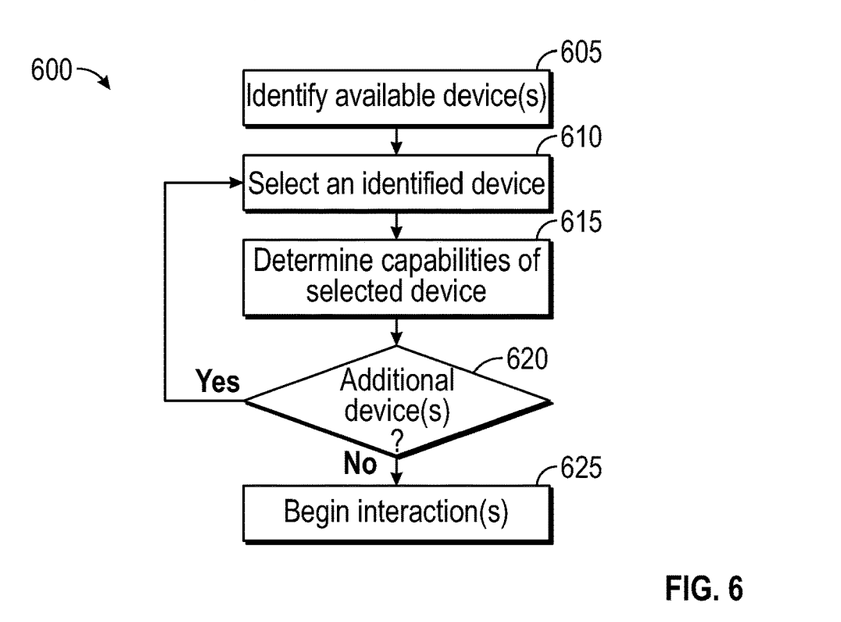
FIG. 6 is a flow diagram illustrating a method of configuring an interaction system to provide improved interactivity, according to one embodiment disclosed herein.

FIG. 6 is a flow diagram illustrating a method 600 of configuring an interaction system to provide improved interactivity, according to one embodiment disclosed herein. The method 600 begins at block 605, where an interactivity system identifies a set of available devices in the environment, for use in augmenting a game. For example, the interactivity system may undergo a discovery period to identify smart devices (e.g., speakers, lights, motors, and the like) that can be controlled by the interactivity system. In some embodiments, this further includes identifying user devices (e.g., phones) that can interact with the interactivity system.

In some embodiments, the available devices are identified automatically. For example, the interactivity system may search for available/discoverable devices in the vicinity. This may require the user(s) to place each such device in a discoverable mode. In another embodiment, the user(s) can manually specify/configure the devices. In still another embodiment, the interactivity system may access a predefined list or collection of devices (e.g., via a smart home hub). In various embodiments, each of the identified devices may be directly controllable (e.g., the interactivity system can directly communicate with the device and cause it to perform outputs), or indirectly (e.g., the interactivity system can transmit instructions or requests to intermediary devices, such as the user's phone, which in turn controls the identified devices).

In some embodiments, the interactivity system can continually search for newly-available devices. In other embodiments, this discovery phase can be performed upon initial startup. In still another embodiment, the interactivity system may periodically poll for new devices, or may search for new devices only when instructed to do so. Once the set of available output devices has been discovered, the method 600 continues to block 610, where the interactivity system selects one of the identified devices. At block 615, the interactivity system determines the capabilities of the selected device. This may include, for example, requesting that the device (or an intermediary) specify the outputs available, such as speaker functionality, lights, actuations, and the like.

The method 600 then proceeds to block 620, where the interactivity system determines whether there is at least one additional device that was identified, but has not yet been evaluated. If so, the method 600 returns to block 610. Otherwise, once the capabilities of all available devices have been identified, the method 600 continues to block 625, where the interactivity system initiates the interactions. For example, the interactivity system may begin the game (e.g., by flashing the lights and/or playing a sound through the available devices).

Figure 7:
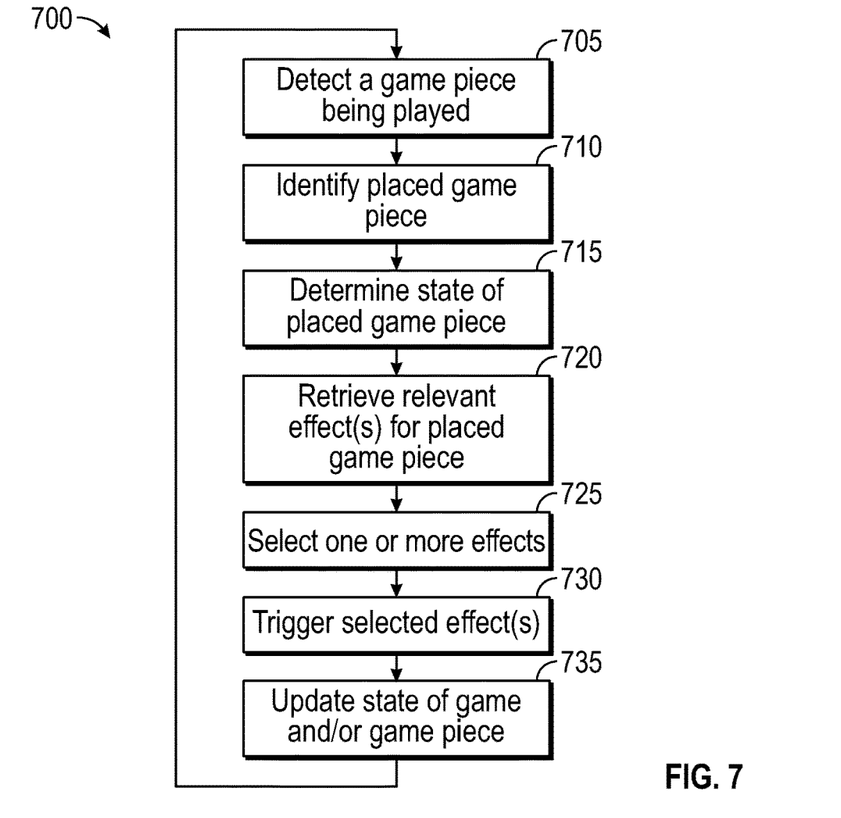
FIG. 7 is a flow diagram illustrating a method of evaluating integrated devices to provide immersive interactivity, according to one embodiment disclosed herein.

FIG. 7 is a flow diagram illustrating a method 700 of evaluating integrated devices to provide immersive interactivity, according to one embodiment disclosed herein. The method 700 begins at block 705, where an interactivity system detects a game piece being played. This may include, for example, detecting the presence of a physical object on the board, such as via one or more weight or pressure sensors. In another embodiment, the interactivity system detects the piece via one or more sensors in the board configured to detect the presence of objects (e.g., to detect magnets in the base of the piece). In various embodiments, the interactivity system may utilize any suitable technique to detect game pieces, such as image recognition, detecting a user verbally announcing that they are adding a new piece, and the like.

In one embodiment, block 705 includes detecting newly-placed pieces. In some embodiments, block 705 further includes detecting existing pieces (e.g., determining which pieces remain on the board), and/or detecting an existing game piece in a new location (e.g., because it was moved by a user). In at least one embodiment, detecting a game piece includes simply receiving an identifier from the piece (e.g., via RFID or NFC). The method 700 then continues to block 710, where the interactivity system identifies the game piece. That is, the interactivity system determines the unique identifier of the piece. In some embodiments, this includes utilizing RFID and/or NFC to receive a unique identifier from the piece. In one embodiment, the interactivity system can additionally or alternatively rely on image analysis or other techniques to identify each piece.

As discussed above, in some embodiments, the board can include one or more sensors configured to identify the piece(s) wherever they are on the board. In another embodiment, the piece can be scanned before being placed on the board. Once the identifier of the piece has been identified, the method 700 continues to block 715, where the interactivity system determines the current state of the piece, and/or of the overall game. This may include, for example, determining the current stats or characteristics of the piece, whether any modifications are currently applicable, and the like. In some embodiments, the state further includes one or more records of prior uses/interactions with the piece. In one embodiment, the interactivity system determines this state of the piece by communicating directly with the piece. In another embodiment, the interactivity system interfaces with one or more other storage components (e.g., in the cloud) to determine the piece's state.

In some embodiments, determining the state of the piece further includes determining the orientation and/or position of the piece. For example, as discussed above, the interactivity system may utilize one or more magnets and/or resistors embedded in the game piece to determine its location and/or orientation. The method 700 then proceeds to block 720, where the interactivity system identifies and retrieves a set of relevant effect(s) for the piece. In one embodiment, each game piece has a predefined set of related/associated effects, and the interactivity system searches this repository to identify the effects that relate to the current piece. This repository may be stored in any suitable location.

In an embodiment, each effect corresponds to one or more outputs, such as lighting effects, sound effects, motions, images, and the like. In some embodiments, some or all of the effects may also be associated with particular events, occurrences, times, or other triggers. For example, a "giant" character may be associated with an initial sound effect to be output when he is placed on the board. Other related effects can include loud booming footsteps whenever the giant is moved on the board, specific audio for various encounters/actions the giant can take, and the like. In addition to sound effects, the interactivity system may also identify effects such as changing the lights in the space, causing the board and/or user's phones to vibrate as the giant moves, and the like.

Once the set of relevant effects have been identified, the method 700 continues to block 725, where the interactivity system selects one or more of the identified effects. In one embodiment, the effect(s) are selected based on the current state of the piece, and/or the overall state of the game. For example, depending on how much the character has been levelled up, different sounds may be selected. Similarly, depending on the other pieces currently on the board, the interactivity system may select a different output effect. Further, the appropriate effect(s) may be based on the position and/or orientation of the piece and/or of other pieces on the board. In this way, the interactivity system can identify particular and specific effects for the given piece, action, and game.

In some embodiments, selecting the effect(s) can also include modifying one or more effect(s) as defined by a set of rules. For example, one such modification may be changing the volume of sounds and/or intensity of light based on the state of the piece and/or the game. Similarly, in some embodiments, the interactivity system may modify the effect(s) on a player-specific basis. For example, some users may receive a relatively louder output via their personal devices, while other uses receive a quieter output (e.g., because they are further from the game piece causing the sound). Moreover, in at least one embodiment, different users may receive entirely different effects, depending on their role and the state of the game.

The method 700 then proceeds to block 730, where the interactivity system triggers the selected effect(s). In one embodiment, to do so, the interactivity system evaluates the set of previously-identified devices, and determines which devices are capable of outputting a given effect. In some embodiments, this decision can be further determined based in part on the position of each device. For example, the interactivity system may output a single effect at different times on different devices, to simulate movement around the space. To trigger the output, the interactivity system can transmit the desired effect(s) directly to the selected device(s), and/or transmit the effect(s) through one or more intermediary devices.

At block 735, the interactivity system updates the state of the game and/or the played game piece, based on the game rules. This may include, for example, transmitting updates to the played game piece, which are then stored in the pieces embedded memory. In some embodiments this includes transmitting the updated state to one or more other storage components (e.g., in the board, or in the cloud). In at least one embodiment, the interactivity system can similarly update the state of any relevant piece or card, if it is affected by the placement of the new piece. The method 700 then returns to block 705. In this way, each time an event occurs in the game, the interactivity system can identify, select, and output appropriate effects.

Figure 8:
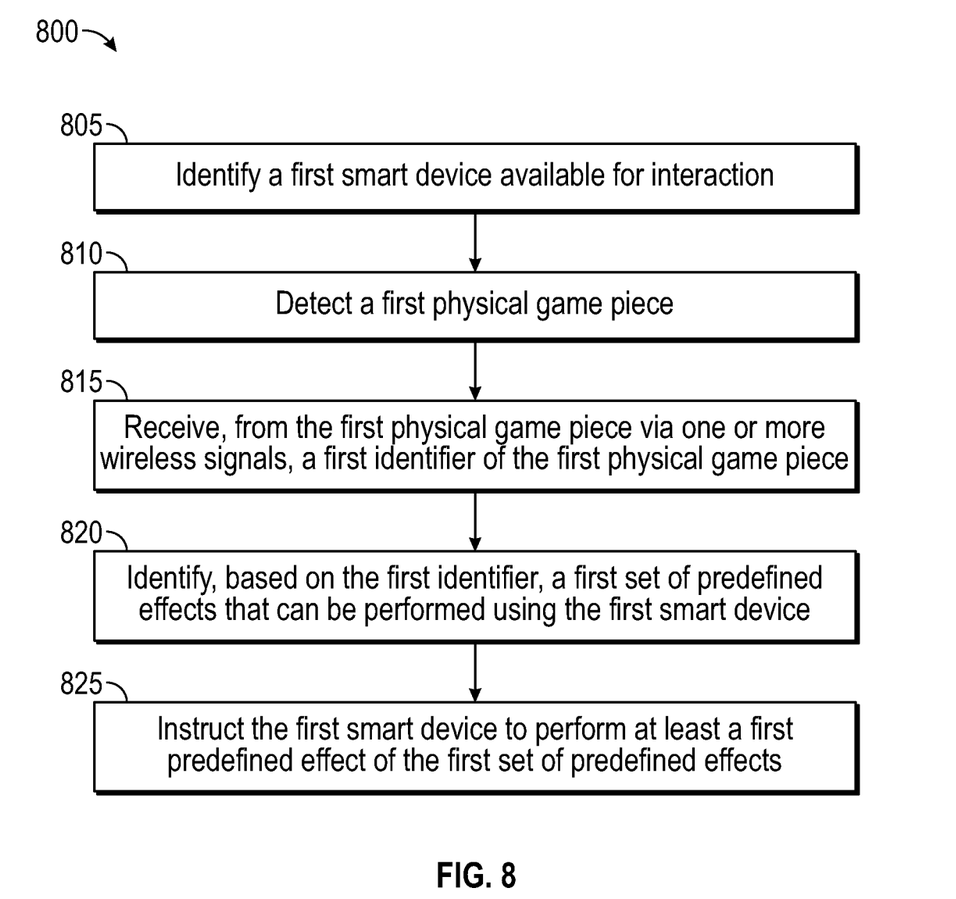
FIG. 8 is a flow diagram illustrating a method of providing immersive interactivity, according to one embodiment disclosed herein.

FIG. 8 is a flow diagram illustrating a method 800 of providing immersive interactivity, according to one embodiment disclosed herein. The method 800 begins at block 805, where an interactivity system identifies a first smart device available for interaction. At block 810, the interactivity system detects a first physical game piece. The method 800 then continues to block 815, where the interactivity system receives, from the first physical game piece via one or more wireless signals, a first identifier of the first physical game piece. Further, at block 820, the interactivity system identifies, based on the first identifier, a first set of predefined effects that can be performed using the first smart device. The method 800 then proceeds to block 825, where the interactivity system instructs the first smart device to perform at least a first predefined effect of the first set of predefined effects.

Figure 9:
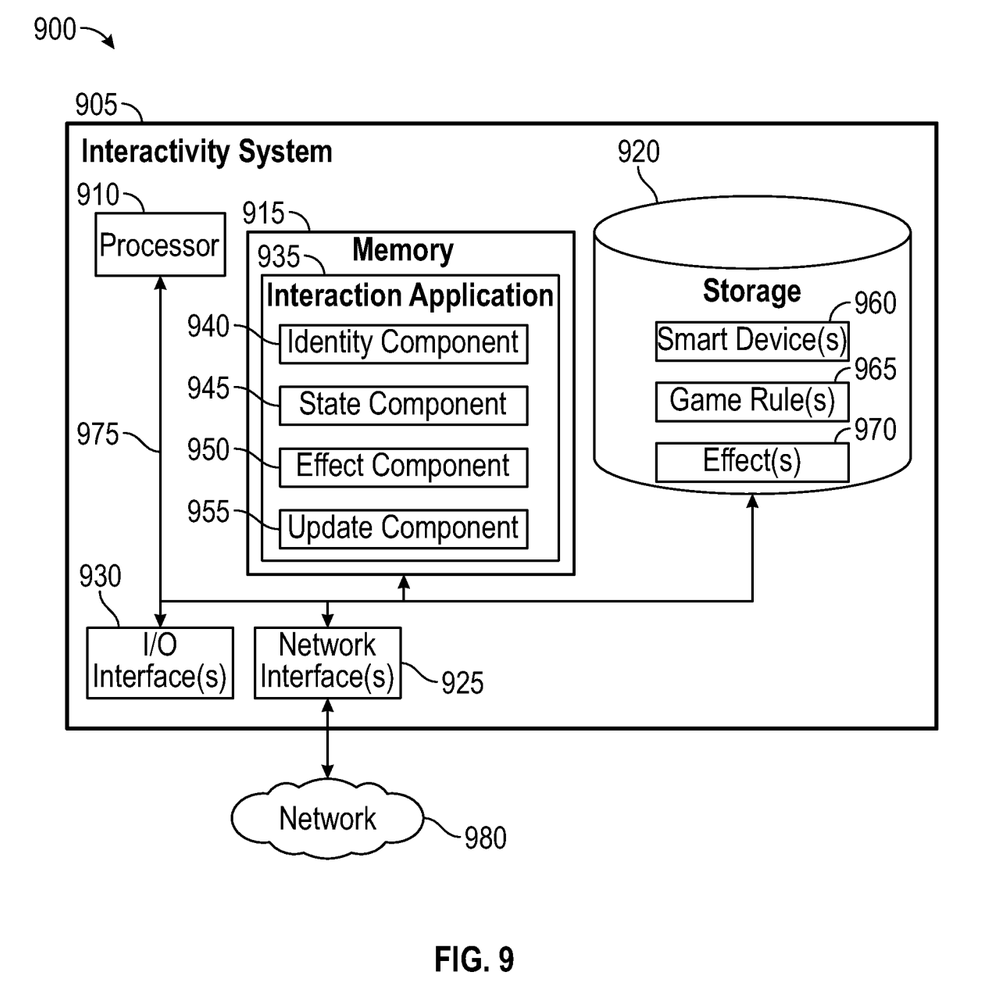
FIG. 9 is a block diagram illustrating an interactivity system configured to perform intelligent analysis and provide improved interactions, according to one embodiment disclosed herein.

FIG. 9 is a block diagram illustrating an Interactivity System 905 configured to perform intelligent analysis and provide improved interactions, according to one embodiment disclosed herein. Although depicted as a physical device, in embodiments, the Interactivity System 905 may be implemented as a virtual device or service, and/or across a number of devices (e.g., in a cloud environment). As illustrated, the Interactivity System 905 includes a Processor 910, Memory 915, Storage 920, a Network Interface 925, and one or more I/O Interfaces 930. In the illustrated embodiment, the Processor 910 retrieves and executes programming instructions stored in Memory 915, as well as stores and retrieves application data residing in Storage 920. The Processor 910 is generally representative of a single CPU and/or GPU, multiple CPUs and/or GPUs, a single CPU and/or GPU having multiple processing cores, and the like. The Memory 915 is generally included to be representative of a random access memory. Storage 920 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as a mouse, a keyboard, a monitor, a touchscreen, etc.) are connected via the I/O Interface(s) 930. Further, via the Network Interface 925, the Interactivity System 905 can be communicatively coupled with one or more other devices and components (e.g., directly or via the Network 980, which may include the Internet, local network(s), and the like). Additionally, the Network 980 may include wired connections, wireless connections, or a combination of wired and wireless connections. As illustrated, the Processor 910, Memory 915, Storage 920, Network Interface(s) 925, and I/O Interface(s) 930 are communicatively coupled by one or more Buses 975. In embodiments, the Interactivity System 905 may be implemented as a standalone device integrated or attached to the game board or mat, as an application executing on a user's phone or computer, as a service executing in the cloud, and the like.

In the illustrated embodiment, the Storage 920 includes records of the available Smart Device(s) 960 in the environment, the relevant Game Rule(s) 965, and the available Effect(s) 970. In an embodiment, as discussed above, the Smart Device(s) 960 are identified during a discovery phase of the system. In some embodiments, the Smart Device(s) 960 include not only IoT devices such as speakers and lights, but also indications of the user's phones or other computing devices, records of devices or outputs available on the game board itself (e.g., speakers, motors, and lights on the board), and the like.

The Game Rule(s) 965 generally correspond to rules that affect how the game is played, such as those defining possible interactions between players/game pieces. In some embodiments, the Game Rule(s) 965 are accessed in one or more remote storages. In at least one embodiment, the user can indicate which game they are playing (e.g., by manually selecting it, or by scanning or tapping a "game card" that instructs the Interactivity System 905 as to which game is being played). Relevant Game Rule(s) 965 can then be retrieved.

The Effect(s) 970 generally correspond to outputs that the Interactivity System 905 can use to augment the gameplay. As discussed above, each Effect 970 can include sound effects, light effects, motions, and the like. In some embodiments, each Effect 970 is associated or linked to specific game piece(s), event(s), trigger(s), and/or location(s) on the board. In this way, when an action or event occurs in the game, the Interactivity System 905 can identify the relevant effect(s), and output them using the Smart Device(s) 960.

In the illustrated embodiment, the Memory 915 includes an Interaction Application 935. Although depicted as software residing in Memory 915, in embodiments, the functionality of the Interaction Application 935 may be implemented using software, hardware, or a combination of hardware and software. In the illustrated embodiment, the Interaction Application 935 includes an Identity Component 940, a State Component 945, an Effect Component 950, and an Update Component 955. Although depicted as discrete components for conceptual clarity, in embodiments, the operations of the Identity Component 940, State Component 945, Effect Component 950, and Update Component 955 may be combined or distributed across any number of components.

In an embodiment, the Identity Component 940 is generally used to identify the game piece(s) in the game. This can include identifying the piece as they are played and/or moved, identifying them as they are drawn or selected from a set of pieces (e.g., as the user draws a card), identifying pieces in the user's inventory or hand, and the like. In some embodiments, the Identity Component 940 identifies the pieces via RFID and/or NFC, such that each game piece explicitly identifies itself to the Identity Component 940. In other embodiments, the Identity Component 940 may utilize image recognition, user input, and the like.

Once the pieces have been identified, the State Component 945 generally determines the current state of the pieces. This can include receiving, from each piece, an indication of its current state. That is, each game piece may store its state locally, and transmit this state to the State Component 945 as needed. In some embodiments, the State Component 945 can further determine the state based on the placement of the piece (e.g., where on the board it is located), and/or the orientation of the piece (e.g., determined via one or more magnets or resistors in the base of the piece).

Using the determined identifier and/or state of each piece, the Effect Component 950 can evaluate and select one or more Effect(s) 970 to be output at any given time, as discussed above. In some embodiments, selecting appropriate Effects 970 is further based on the determined Game Rules 965. Once an Effect 970 is selected, the Effect Component 950 facilitates its output, such as by instructing or requesting one or more Smart Devices 960 to output it.

In an embodiment, the Update Component 955 generally determines updated states for the game pieces and/or the overall game (based on the Game Rules 965), and updates the relevant components. For example, upon determining that a user has modified a game piece (e.g., by tapping it with a card), the Update Component 955 may notify the piece that it has been modified, as well as an indication of the modification. Similarly, upon determining that the modification has expired, the Update Component 955 can again update the piece(s). In this way, the Interaction Application 935 can automatically track the game's state, and update each relevant piece as needed.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying, by an interactivity system, a first smart device available for interaction;
   detecting, by the interactivity system, a first physical game piece;
   receiving, from the first physical game piece via one or more wireless signals, a first identifier of the first physical game piece;
   identifying, based on the first identifier, a first set of predefined effects that can be performed using the first smart device;
   determining an orientation of the first physical game piece based on determined resistance values of a plurality of resistors in a predefined configuration on a base of the first physical game piece, the resistance values determined using electric current passed through the plurality of resistors via electrical contact pads on a game board; and
   instructing the first smart device to perform at least a first predefined effect of the first set of predefined effects, based on the orientation of the first physical game piece.

2. The method of claim 1, the method further comprising:
   determining, by the interactivity system, a location of the first physical game piece; and
   selecting the first predefined effect based further on the location of the first physical game piece.

3. The method of claim 1, wherein the first set of predefined effects comprise an augmented reality effect, and wherein the first smart device performs the first predefined effect by:
   capturing one or more images of the first physical game piece;
   rendering a virtual element corresponding to the first physical game piece; and
   displaying the virtual element superimposed over the one or more images.

4. The method of claim 1, the method further comprising:
   receiving, from the first physical game piece, a current state of the first physical game piece;
   determining a new state of the first physical game piece based on determining that the first physical game piece was played; and
   transmitting, to the first physical game piece, the new state.

5. The method of claim 4, wherein the current state is based at least in part on prior uses of the first physical game piece, wherein the first physical game piece stores the current state in a memory.

6. The method of claim 4, the method further comprising selecting the first predefined effect based on the current state of the first physical game piece.

7. The method of claim 1, wherein the first set of predefined effects comprise at least one of an audio effect or a lighting effect.

8. A non-transitory computer-readable medium containing computer program code that, when executed by operation of one or more computer processors, performs an operation comprising:
   identifying, by an interactivity system, a first smart device available for interaction;
   detecting, by the interactivity system, a first physical game piece;
   receiving, from the first physical game piece via one or more wireless signals, a first identifier of the first physical game piece;
   identifying, based on the first identifier, a first set of predefined effects that can be performed using the first smart device;
   determining an orientation of the first physical game piece based on determined resistance values of a plurality of resistors in a predefined configuration on a base of the first physical game piece, the resistance values determined using electric current passed through the plurality of resistors via electrical contact pads on a game board; and
   instructing the first smart device to perform at least a first predefined effect of the first set of predefined effects, based on the orientation of the first physical game piece.

9. The computer-readable medium of claim 8, the operation further comprising:
   determining, by the interactivity system, (i) a location of the first physical game piece and (ii) an orientation of the first physical game piece; and
   selecting the first predefined effect based on the location or orientation of the first physical game piece.

10. The computer-readable medium of claim 8, wherein the first set of predefined effects comprise an augmented reality effect, and wherein the first smart device performs the first predefined effect by:

capturing one or more images of the first physical game piece;

rendering a virtual element corresponding to the first physical game piece; and displaying the virtual element superimposed over the one or more images.

11. The computer-readable medium of claim 8, the operation further comprising:

receiving, from the first physical game piece, a current state of the first physical game piece;

determining a new state of the first physical game piece based on determining that the first physical game piece was played; and transmitting, to the first physical game piece, the new state.

12. The computer-readable medium of claim 11, wherein the current state is based at least in part on prior uses of the first physical game piece, wherein the first physical game piece stores the current state in a memory.

13. The computer-readable medium of claim 11, the operation further comprising selecting the first predefined effect based on the current state of the first physical game piece.

14. The computer-readable medium of claim 8, wherein the first set of predefined effects comprise at least one of an audio effect or a lighting effect.

15. A system, comprising:

one or more computer processors; and a memory containing a program which when executed by the one or more computer processors performs an operation, the operation comprising:

identifying, by an interactivity system, a first smart device available for interaction;

detecting, by the interactivity system, a first physical game piece;

receiving, from the first physical game piece via one or more wireless signals, a first identifier of the first physical game piece;

identifying, based on the first identifier, a first set of predefined effects that can be performed using the first smart device;

determining an orientation of the first physical game piece based on determined resistance values of a plurality of resistors in a predefined configuration on a base of the first physical game piece, the resistance values determined using electric current passed through the plurality of resistors via electrical contact pads on a game board; and instructing the first smart device to perform at least a first predefined effect of the first set of predefined effects, based on the orientation of the first physical game piece.

16. The system of claim 15, the operation further comprising:

determining, by the interactivity system, (i) a location of the first physical game piece and (ii) an orientation of the first physical game piece; and selecting the first predefined effect based on the location or orientation of the first physical game piece.

17. The system of claim 15, wherein the first set of predefined effects comprise an augmented reality effect, and wherein the first smart device performs the first predefined effect by:

capturing one or more images of the first physical game piece;

rendering a virtual element corresponding to the first physical game piece; and displaying the virtual element superimposed over the one or more images.

18. The system of claim 15, the operation further comprising:

receiving, from the first physical game piece, a current state of the first physical game piece;

determining a new state of the first physical game piece based on determining that the first physical game piece was played; and transmitting, to the first physical game piece, the new state.

19. The system of claim 18, wherein the current state is based at least in part on prior uses of the first physical game piece, wherein the first physical game piece stores the current state in a memory.

20. The system of claim 18, the operation further comprising selecting the first predefined effect based on the current state of the first physical game piece.

* * * * *